United States Patent
He et al.

(10) Patent No.: US 9,363,702 B2
(45) Date of Patent: Jun. 7, 2016

(54) METHOD AND SYSTEM FOR ENABLING DEVICE-TO-DEVICE COMMUNICATION

(71) Applicant: Intel Corporation, Santa Clara, CA (US)

(72) Inventors: Hong He, Beijing (CN); Mo-Han Fong, Sunnyvale, CA (US); Youn Hyoung Heo, Seoul (KR); Jong-Kae Fwu, Sunnyvale, CA (US); Seunghee Han, Anyangshi (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,983

(22) PCT Filed: Aug. 2, 2013

(86) PCT No.: PCT/US2013/053428
§ 371 (c)(1),
(2) Date: Dec. 17, 2013

(87) PCT Pub. No.: WO2014/022776
PCT Pub. Date: Feb. 6, 2014

(65) Prior Publication Data
US 2015/0139197 A1    May 21, 2015

Related U.S. Application Data

(60) Provisional application No. 61/679,627, filed on Aug. 3, 2012.

(51) Int. Cl.
*H04J 3/16* (2006.01)
*H04B 7/212* (2006.01)
(Continued)

(52) U.S. Cl.
CPC .......... *H04W 28/0221* (2013.01); *H04B 17/27* (2015.01); *H04L 5/00* (2013.01);
(Continued)

(58) Field of Classification Search
CPC . H04W 24/10; H04W 72/0446; H04W 72/04; H04W 76/023; H04L 5/0012; H04L 5/0007; H04B 7/2612

USPC .......... 370/329–331, 337, 468, 395.21, 338, 370/347, 426, 431
See application file for complete search history.

(56) References Cited

U.S. PATENT DOCUMENTS

| 5,754,638 A | 5/1998 | Kusunoki |
| 6,625,227 B1 | 9/2003 | Shull et al. |

(Continued)

FOREIGN PATENT DOCUMENTS

| CN | 101730172 A | 6/2010 |
| CN | 102333293 A | 1/2012 |

(Continued)

OTHER PUBLICATIONS

"3rd Generation Partnership Project; Technical Specification Group Core Network and Terminals; Access Network Discovery and Selection Function (ANDSF) Management Object (MO) (Release 11)", 3GPP TS 24.312 V11.3.0, (2012).

(Continued)

*Primary Examiner* — Hanh N Nguyen
(74) *Attorney, Agent, or Firm* — Schwegman Lundberg & Woessner, P.A.

(57) ABSTRACT

Mobile communication devices, such as user equipment (UE) using 3GPP-LTE or LTE Advanced, may communicate directly with another UE through a system called Device-to-Device (D2D) communication. The establishment of a D2D communication session may involve having one of the UEs trigger the signaling procedures. In particular, a D2D resource re-allocation method may be used to optimize the D2D communication resource utilization efficiency in a dynamic manner, which is fully controlled by one of the D2D pair (termed the master UE or M-UE). The M-UE may be arranged to re-allocate resources based on the buffer status report (BSR) of the UEs in the D2D communication session. The M-UE may be further arranged to dynamically change the configuration of the transmission window based on characteristics of the D2D communication session.

8 Claims, 4 Drawing Sheets

(51) Int. Cl.

| | | |
|---|---|---|
| H04W 28/02 | (2009.01) | |
| H04W 24/04 | (2009.01) | |
| H04W 52/00 | (2009.01) | |
| H04L 5/00 | (2006.01) | |
| H04L 12/24 | (2006.01) | |
| H04L 12/26 | (2006.01) | |
| H04L 12/807 | (2013.01) | |
| H04L 29/06 | (2006.01) | |
| H04L 29/08 | (2006.01) | |
| H04W 4/00 | (2009.01) | |
| H04W 8/18 | (2009.01) | |
| H04W 28/04 | (2009.01) | |
| H04W 36/00 | (2009.01) | |
| H04W 40/34 | (2009.01) | |
| H04W 52/02 | (2009.01) | |
| H04W 72/00 | (2009.01) | |
| H04W 72/04 | (2009.01) | |
| H04W 76/02 | (2009.01) | |
| H04W 24/02 | (2009.01) | |
| H04N 21/2343 | (2011.01) | |
| H04N 21/258 | (2011.01) | |
| H04W 40/02 | (2009.01) | |
| H04W 16/18 | (2009.01) | |
| H04W 76/04 | (2009.01) | |
| H04W 24/10 | (2009.01) | |
| H04W 4/02 | (2009.01) | |
| H04W 12/06 | (2009.01) | |
| H04W 64/00 | (2009.01) | |
| H04W 88/06 | (2009.01) | |
| H04L 12/703 | (2013.01) | |
| H04B 17/27 | (2015.01) | |
| H04W 16/28 | (2009.01) | |
| H04W 36/14 | (2009.01) | |
| H04W 88/12 | (2009.01) | |

(52) U.S. Cl.
CPC ......... *H04L 5/0057* (2013.01); *H04L 41/0659* (2013.01); *H04L 41/0836* (2013.01); *H04L 43/0811* (2013.01); *H04L 45/28* (2013.01); *H04L 47/27* (2013.01); *H04L 65/1006* (2013.01); *H04L 65/4092* (2013.01); *H04L 65/80* (2013.01); *H04L 67/16* (2013.01); *H04L 67/303* (2013.01); *H04N 21/23439* (2013.01); *H04N 21/25825* (2013.01); *H04W 4/00* (2013.01); *H04W 4/005* (2013.01); *H04W 4/008* (2013.01); *H04W 4/02* (2013.01); *H04W 8/18* (2013.01); *H04W 12/06* (2013.01); *H04W 16/18* (2013.01); *H04W 24/02* (2013.01); *H04W 24/04* (2013.01); *H04W 24/10* (2013.01); *H04W 28/0236* (2013.01); *H04W 28/04* (2013.01); *H04W 36/0072* (2013.01); *H04W 40/02* (2013.01); *H04W 40/34* (2013.01); *H04W 52/00* (2013.01); *H04W 52/0209* (2013.01); *H04W 52/0212* (2013.01); *H04W 52/0216* (2013.01); *H04W 64/003* (2013.01); *H04W 72/005* (2013.01); *H04W 72/04* (2013.01); *H04W 72/042* (2013.01); *H04W 72/044* (2013.01); *H04W 72/0406* (2013.01); *H04W 72/0413* (2013.01); *H04W 72/0446* (2013.01); *H04W 76/02* (2013.01); *H04W 76/021* (2013.01); *H04W 76/023* (2013.01); *H04W 76/025* (2013.01); *H04W 76/026* (2013.01); *H04W 76/048* (2013.01); *H04W 88/06* (2013.01); *H04W 16/28* (2013.01); *H04W 36/14* (2013.01); *H04W 52/0258* (2013.01); *H04W 88/12* (2013.01); *Y02B 60/50* (2013.01)

(56) References Cited

U.S. PATENT DOCUMENTS

| | | | |
|---|---|---|---|
| 7,474,686 | B2 | 1/2009 | Ho |
| 7,734,752 | B2 | 6/2010 | Zuk et al. |
| 7,924,742 | B2 | 4/2011 | Hanes |
| 8,155,102 | B1* | 4/2012 | Hakola et al. ................ 370/345 |
| 8,213,360 | B2 | 7/2012 | Koskela et al. |
| 8,359,038 | B2 | 1/2013 | Hakola et al. |
| 8,447,315 | B2 | 5/2013 | Hakola et al. |
| 8,520,575 | B2 | 8/2013 | Doppler et al. |
| 8,554,200 | B2 | 10/2013 | Ribeiro et al. |
| 8,577,363 | B2 | 11/2013 | Wijting et al. |
| 8,588,690 | B2 | 11/2013 | Turtinen et al. |
| 8,588,803 | B2 | 11/2013 | Hakola et al. |
| 8,666,403 | B2 | 3/2014 | Yu et al. |
| 8,755,316 | B2 | 6/2014 | Aschan et al. |
| 8,761,099 | B2* | 6/2014 | Charbit ............... H04W 72/04 370/329 |
| 8,775,944 | B2 | 7/2014 | Hayton |
| 8,913,518 | B2 | 12/2014 | Heo et al. |
| 8,973,088 | B1 | 3/2015 | Leung et al. |
| 9,036,603 | B2 | 5/2015 | Johnsson et al. |
| 9,100,160 | B2 | 8/2015 | Tarradell et al. |
| 9,191,828 | B2 | 11/2015 | Li et al. |
| 2002/0045428 | A1 | 4/2002 | Chesson |
| 2004/0170217 | A1 | 9/2004 | Ho |
| 2004/0258040 | A1 | 12/2004 | Joshi et al. |
| 2005/0043045 | A1 | 2/2005 | Cheng et al. |
| 2007/0129076 | A1 | 6/2007 | Cho et al. |
| 2008/0045178 | A1 | 2/2008 | Venkatachalam |
| 2008/0318607 | A1 | 12/2008 | Torsner et al. |
| 2009/0016232 | A1 | 1/2009 | Kwon et al. |
| 2009/0207817 | A1 | 8/2009 | Montemurro et al. |
| 2010/0009675 | A1 | 1/2010 | Wijting et al. |
| 2010/0009690 | A1 | 1/2010 | Jin et al. |
| 2010/0026802 | A1 | 2/2010 | Titus et al. |
| 2010/0110897 | A1 | 5/2010 | Chun et al. |
| 2010/0150082 | A1 | 6/2010 | Shin et al. |
| 2010/0265904 | A1 | 10/2010 | Yang et al. |
| 2010/0317345 | A1 | 12/2010 | Futaki et al. |
| 2011/0029834 | A1 | 2/2011 | Yang et al. |
| 2011/0134774 | A1 | 6/2011 | Pelletier et al. |
| 2011/0170420 | A1 | 7/2011 | Xi et al. |
| 2011/0250892 | A1 | 10/2011 | Gupta et al. |
| 2011/0256894 | A1 | 10/2011 | Khandelia et al. |
| 2011/0268006 | A1 | 11/2011 | Koskela et al. |
| 2011/0292854 | A1 | 12/2011 | Terry et al. |
| 2011/0306349 | A1 | 12/2011 | Hakola et al. |
| 2011/0317559 | A1 | 12/2011 | Kern et al. |
| 2011/0317571 | A1 | 12/2011 | Kokkinen et al. |
| 2012/0011247 | A1 | 1/2012 | Mallik et al. |
| 2012/0030358 | A1 | 2/2012 | Mackenzie |
| 2012/0057476 | A1 | 3/2012 | Chan et al. |
| 2012/0083283 | A1 | 4/2012 | Phan et al. |
| 2012/0093098 | A1 | 4/2012 | Charbit et al. |
| 2012/0106517 | A1 | 5/2012 | Charbit et al. |
| 2012/0134344 | A1 | 5/2012 | Yu et al. |
| 2012/0140743 | A1 | 6/2012 | Pelletier et al. |
| 2012/0147815 | A1 | 6/2012 | Meyer et al. |
| 2012/0155355 | A1 | 6/2012 | Kwon et al. |
| 2012/0163296 | A1 | 6/2012 | Cheon et al. |
| 2012/0176950 | A1 | 7/2012 | Zhang et al. |
| 2012/0182962 | A1 | 7/2012 | Patil et al. |
| 2012/0188949 | A1 | 7/2012 | Salkintzis et al. |
| 2012/0190331 | A1 | 7/2012 | Ahmed et al. |
| 2012/0213183 | A1 | 8/2012 | Chen et al. |
| 2012/0250520 | A1 | 10/2012 | Chen et al. |
| 2012/0309447 | A1 | 12/2012 | Mustajarvi et al. |
| 2013/0021968 | A1 | 1/2013 | Reznik et al. |
| 2013/0064138 | A1 | 3/2013 | Hakola et al. |
| 2013/0077484 | A1 | 3/2013 | Zhao et al. |
| 2013/0160101 | A1 | 6/2013 | Hakola et al. |

(56) References Cited

U.S. PATENT DOCUMENTS

| | | | |
|---|---|---|---|
| 2013/0170351 A1 | 7/2013 | Reznik et al. | |
| 2013/0223352 A1* | 8/2013 | Sartori et al. | 370/329 |
| 2013/0223356 A1* | 8/2013 | Khoshnevis et al. | 370/329 |
| 2013/0250910 A1 | 9/2013 | Liao et al. | |
| 2014/0022898 A1 | 1/2014 | Kim et al. | |
| 2014/0025804 A1 | 1/2014 | Mongazon-cazavet et al. | |
| 2014/0036793 A1 | 2/2014 | Johnsson et al. | |
| 2014/0036795 A1 | 2/2014 | Martinez Tarradell et al. | |
| 2014/0036876 A1 | 2/2014 | Li et al. | |
| 2014/0040504 A1 | 2/2014 | Gupta | |
| 2014/0171091 A1 | 6/2014 | Cai et al. | |
| 2014/0185467 A1 | 7/2014 | Heo et al. | |
| 2015/0016368 A1 | 1/2015 | Dai et al. | |
| 2015/0036672 A1 | 2/2015 | Kim et al. | |
| 2015/0049732 A1 | 2/2015 | Xue et al. | |
| 2015/0173016 A1 | 6/2015 | Heo et al. | |
| 2015/0181564 A1 | 6/2015 | Rao et al. | |
| 2015/0305077 A1 | 10/2015 | Johnsson et al. | |

FOREIGN PATENT DOCUMENTS

| | | |
|---|---|---|
| CN | 102333343 A | 1/2012 |
| CN | 102395160 A | 3/2012 |
| CN | 102612067 A | 7/2012 |
| CN | 103582006 A | 2/2014 |
| CN | 103582066 A | 2/2014 |
| CN | 104412524 A | 3/2015 |
| CN | 104429141 A | 3/2015 |
| CN | 104429147 A | 3/2015 |
| CN | 104471876 A | 3/2015 |
| EP | 2421306 A1 | 2/2012 |
| EP | 2566199 A1 | 3/2013 |
| EP | 2747508 A1 | 6/2014 |
| EP | 2880781 A1 | 6/2015 |
| EP | 2880782 A | 6/2015 |
| EP | 2880943 A1 | 6/2015 |
| EP | 2880952 | 6/2015 |
| EP | 2880955 A | 6/2015 |
| EP | 2880956 A2 | 6/2015 |
| ES | 2439623 A2 | 1/2014 |
| ES | 2440391 A2 | 1/2014 |
| ES | 2439623 R1 | 3/2014 |
| ES | 2440391 R1 | 3/2014 |
| ES | 2447215 A2 | 3/2014 |
| ES | 2473415 A2 | 7/2014 |
| ES | 2481265 R1 | 10/2014 |
| ES | 2507465 A1 | 10/2014 |
| ES | 2508390 A1 | 10/2014 |
| ES | 2510290 A1 | 10/2014 |
| ES | 2512965 A1 | 10/2014 |
| ES | 2473415 R1 | 11/2014 |
| ES | 2523417 A1 | 11/2014 |
| ES | 2523474 A1 | 11/2014 |
| ES | 2525773 A1 | 12/2014 |
| ES | 2447215 R1 | 1/2015 |
| ES | 2481265 B2 | 5/2015 |
| FR | 2994361 A1 | 2/2014 |
| JP | 2007295541 A | 11/2007 |
| JP | 2009141756 A | 6/2009 |
| JP | 2009272951 A | 11/2009 |
| JP | 2010199871 A | 9/2010 |
| JP | 2011530216 A | 12/2011 |
| KR | 20110049622 A | 5/2011 |
| KR | 1020110052426 A | 5/2011 |
| KR | 1020110086758 A | 7/2011 |
| KR | 1020110093642 A | 8/2011 |
| KR | 1020120031546 A | 4/2012 |
| KR | 1020120070444 A | 6/2012 |
| KR | 1020120071676 A | 7/2012 |
| KR | 1020120074251 A | 7/2012 |
| KR | 1020120074255 A | 7/2012 |
| TW | 201410054 A | 3/2014 |
| TW | 201419898 A | 5/2014 |
| WO | WO-0163946 A1 | 8/2001 |
| WO | WO-2010028690 A1 | 3/2010 |
| WO | WO-2010080966 A1 | 7/2010 |
| WO | WO-2010130870 A1 | 11/2010 |
| WO | WO-2011088406 A1 | 7/2011 |
| WO | WO-2011119680 A2 | 9/2011 |
| WO | WO-2011130623 A2 | 10/2011 |
| WO | WO-2011131666 A1 | 10/2011 |
| WO | WO-2011134329 A1 | 11/2011 |
| WO | WO-2011139043 A2 | 11/2011 |
| WO | WO-2011160682 A1 | 12/2011 |
| WO | WO-2012016378 A1 | 2/2012 |
| WO | WO-2012028076 A1 | 3/2012 |
| WO | WO-2012056209 A1 | 5/2012 |
| WO | WO-2012066189 A1 | 5/2012 |
| WO | WO-2012068731 A1 | 5/2012 |
| WO | WO-2012077977 A2 | 6/2012 |
| WO | WO-2012087009 A2 | 6/2012 |
| WO | WO-2012091420 A2 | 7/2012 |
| WO | WO-2013185841 A1 | 12/2013 |
| WO | WO-2014021984 A1 | 2/2014 |
| WO | WO-2014021987 A1 | 2/2014 |
| WO | WO-2014021989 A1 | 2/2014 |
| WO | WO-2014021990 A1 | 2/2014 |
| WO | WO-2014021998 A2 | 2/2014 |
| WO | WO-2014021998 A3 | 2/2014 |
| WO | WO-2014022769 A1 | 2/2014 |
| WO | WO-2014022776 A1 | 2/2014 |
| WO | WO-2014022797 A1 | 2/2014 |

OTHER PUBLICATIONS

"3rd Generation Partnership Project; Technical Specification Group Core Network and Terminals; Access Network Discovery and Selection Function (ANDSF) Management Object (MO) (Release 11)", ETSI TS 24.312 Version 11.6.0, (Mar. 15, 2013).

"3rd Generation Partnership Project; Technical Specification Group Core Network and Terminals; Access Network Discovery and Selection Function (ANDSF) Management Object (MO) (Release 11)", ETSI TS 24.312 Version 11.3.0, (Jun. 27, 2012).

"3rd Generation Partnership Project; Technical Specification Group Services and System Aspects; Data Identification in Access Network Discovery and Selection Function (ANDSF) (DIDA) (Release 11)", 3GPP TR 23.855 V11.0.0, (2012).

"U.S. Appl. No. 13/711,338, Applicant Interview Summary mailed Aug. 25, 2014", 2 pgs.

"U.S. Appl. No. 13/711,338, Examiner Interview Summary mailed Aug. 21, 2014", 2 pgs.

"U.S. Appl. No. 13/718,745, Non Final Office Action mailed Aug. 7, 2014", 19 pgs.

"U.S. Appl. No. 13/718,745, Response filed Sep. 30, 2014 to Non Final Office Action mailed Aug. 7, 2014", 16 pgs.

"U.S. Appl. No. 13/729,117, Notice of Allowance mailed Aug. 12, 2014", 14 pgs.

"U.S. Appl. No. 13/790,630, Non Final Office Action mailed Sep. 5, 2014", 17 pgs.

"Application-ID", Qualcomm Incorporated, C1-122886, Change Request 24.312 CR 0098 rev—Current Version: 11.3.0 3GPP TSG-CT WG 1 Meeting #79, (2012), 1-14.

"Discussion on OS type leaf", Qualcomm Incorporated, C1-122076, 3GPP TSG CT WG1 Meeting #78, (May 2012).

"Finland Application Serial No. 20135806, Office Action mailed Aug. 15, 2014", 7 pgs.

"International Application Serial No. PCT/US2013/045656, International Search Report mailed Apr. 15, 2014", 3 pgs.

"International Application Serial No. PCT/US2013/045656, Written Opinion mailed Apr. 15, 2014", 10 pgs.

"Netherlands Application Serial No. 2011257, Search Report and Written Opinion mailed Mar. 18, 2014", 11 pgs.

"Netherlands Application Serial No. 2011259, Search Report mailed Jun. 13, 2014", 2 pgs.

"Netherlands Application Serial No. 2011259, Written Opinion mailed Jun. 13, 2014", 8 pgs.

"Spanish Application Serial No. P201331208, Search Report mailed Sep. 22, 2014", 4 pgs.

(56) References Cited

OTHER PUBLICATIONS

"Spanish Application Serial No. P201331208, Written Opinion mailed Sep. 22, 2014", 4 pgs.
"T5 based downlink small data transfer without establishing RRC security", CATT; 3GPP Draft: S2-122826 T5 Based Downlink Small Data Transfer Without Establishing RRC Security, 3rd Generation Partnership Project (3GPP), Mobile Competence Centre; 650, Route Des Lucioles: F-06921 Sophia-Antipolis Cedex; France deel SA Wg2, nr. Barcelona, Spain (Jul. 2012), 3 pgs.
"Transfer and update of solution of small data transfer in NAS signalling", Vodafone, [RIM ?]; 3GPP Draft; S2-123414 Rev 3112 Small Data by NAS, 3rd Generation Partnership Project (3GPP), Mobile Competence Centre; 650, Route Des Lucioles; F-06921 Sophia-Antipolis Cedex; France, (Jul. 2012), 7 pgs.
"Use of generic NAS transport for small data", ZTE, Intel, Interdigital; 3GPP Draft; s2-123416, 3rd Generation Partnership Project (3GPP), Mobile Competence Centre; 650, Route Des Lucioles; F-06921 Sophia-Antipolis Cedex; deel SA Wg2, nr. Barcelona, Spain, (Jul. 2012), 7 pgs.
Abraham, Santosh, et al., "Efficient Device and Service Discovery for Peer-to-Peer (P2P) scenarios", IEEE 802.11-11/1517r0, (Oct. 25, 2011).
Fodor, Gabor, et al., "Design Aspects of Network Assisted Device-to-Device Communications", IEEE Communications Magazine, vol. 50, Issue 3, (Mar. 2012), 170-177.
Mobility, Motorola, et al., "Conclusions for Traffic Identification based on Application", (Nov. 2011).
"Access Network Discovery and Selection Function (ANDSF) Management Object", Universal Mobile Telecommunications System (UMTS); LTE;, (Jul. 2012), 72-155.
"U.S. Appl. No. 13/687,838, Final Office Action mailed Apr. 10, 2015", 36 pgs.
"U.S. Appl. No. 13/687,838, Non Final Office Action mailed Nov. 26, 2014", 31 pgs.
"U.S. Appl. No. 13/687,838, Response filed Feb. 26, 2015 to Non Final Office Action mailed Nov. 26, 2014", 13 pgs.
"U.S. Appl. No. 13/711,338, Examiner Interview Summary mailed May 4, 2015", 3 pgs.
"U.S. Appl. No. 13/711,338, Non Final Office Action mailed Feb. 4, 2015", 16 pgs.
"U.S. Appl. No. 13/711,338, Response filed May 4, 2015 to Non Final Office Action mailed Feb. 4, 2015", 16 pgs.
"U.S. Appl. No. 13/718,745, Notice of Allowance mailed Jan. 25, 2015", 12 pgs.
"U.S. Appl. No. 13/790,630, Final Office Action mailed Feb. 3, 2015", 16 pgs.
"U.S. Appl. No. 13/790,630, Notice of Allowance mailed Mar. 31, 2015", 7 pgs.
"U.S. Appl. No. 13/790,630, Response filed Jan. 5, 2015 to Non Final Office Action mailed Sep. 5, 2014", 9 pgs.
"U.S. Appl. No. 13/790,630, Response filed Mar. 17, 2015 to Final Office Action mailed Feb. 3, 2015", 10 pgs.
"U.S. Appl. No. 14/570,555, Preliminary Amendment filed Mar. 2, 2015", 9 pgs.
"Finland Application Serial No. 20135807, Office Action mailed Mar. 26, 2015", in English, 8 pgs.
"International Application Serial No. PCT/US2013/044139, International Preliminary Report on Patentability mailed Feb. 12, 2015", 7 pgs.
"International Application Serial No. PCT/US2013/044445, International Preliminary Report on Patentability mailed Feb. 12, 2015", 11 pgs.
"International Application Serial No. PCT/US2013/044530, International Preliminary Report on Patentability mailed Feb. 12, 2015", 9 pgs.
"International Application Serial No. PCT/US2013/044543, International Preliminary Report on Patentability mailed Feb. 12, 2015", 10 pgs.
"International Application Serial No. PCT/US2013/045656, International Preliminary Report on Patentability mailed Feb. 12, 2015", 12 pgs.
"International Application Serial No. PCT/US2013/053420, International Preliminary Report on Patentability mailed Feb. 12, 2015", 6 pgs.
"International Application Serial No. PCT/US2013/053428, International Preliminary Report on Patentability mailed Feb. 12, 2015", 10 pgs.
"International Application Serial No. PCT/US2013/053470, International Preliminary Report on Patentability mailed Feb. 12, 2015", 6 pgs.
"Spanish Application Serial No. 201331212, Office Action mailed Mar. 2, 2015", W/ English References, 1 pg.
"Spanish Application Serial No. 201331212, Search Report mailed Oct. 27, 2014", W/ English References, 4 pgs.
"Spanish Application Serial No. 201331212, Written Opinion mailed Oct. 27, 2014", W/ English Translation, 10 pgs.
"Spanish Application Serial No. P201331208, Response filed Feb. 6, 2015 to Office Action mailed Sep. 22, 2014", in Spanish, 18 pgs.
"Sweden Application Serial No. 1350931-0, Office Action mailed Dec. 29, 2014", w/ English Claims, 16 pgs.
"Sweden Application Serial No. 1350932-8, Office Action mailed Jan. 21, 2015", W/ English Translation, 5 pgs.
"Taiwanese Application Serial No. 102127609, Office Action mailed Dec. 1, 2014", w/ English Translation, 15 pgs.
"Taiwanese Application Serial No. 102127618, Office Action mailed Dec. 1, 2014", W/ English Translation, 20 pgs.
"Taiwanese Application Serial No. 102127618, Response filed Mar. 2, 2015 to Office Action mailed Dec. 1, 2014", W/ English Claims, 10 pgs.
"Access Network Discovery and Selection Function (ANDSF) Management Object MO", 3GPP TS 24.312 V11.4.0. Technical Specification Group Core Network and Terminals. Release 11., (Sep. 2012), 168 pgs.
"U.S. Appl. No. 13/711,338, Preliminary Amendment filed Mar. 15, 2013", 6 pgs.
"U.S. Appl. No. 14/124,984, Preliminary Amendment filed Dec. 9, 2013", 11 pgs.
"U.S. Appl. No. 14/125,973, Preliminary Amendment filed Dec. 13, 2013", 3 pgs.
"Change Request", 3GPP TSG-CT WG1 Meeting #79. C1-122989., (Aug. 6, 2012), 14 pgs.
"Change Request", 3GPP TSG-CT WG1 Meeting #79. C1-123455. Revision of C1-123435, C1-123079, C1-122886., (Aug. 6, 2012), 97 pgs.
"Change Request", 3GPP TSG-CT WG1 Meeting #80. C1-123965., (Oct. 2012), 15 pgs.
"Evolved Universal Terrestrial Radio Access (E-UTRA); Medium Access Control (MAC) protocol specification", 3GPP TS 36.321 V10.5.0. Technical Specification Group Radio Access Network. Release 10., (Mar. 2012), 54 pgs.
"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.
"Evolved Universal Terrestrial Radio Access (E-UTRA); Radio Resource Control (RRC); Protocol specification", 3GPP TS 36.331 V11.2.0. Technical Specification Group Radio Access Network. Release 11., (Dec. 2012), 340 pgs.
"Evolved Universal Terrestrial Radio Access Network (E-UTRAN); S1 Application Protocol (S1AP)", 3GPP TS 36.413 V11.2.1. Technical Specification Group Radio Access Network. Release 11., (Feb. 2013), 272 pgs.
"International Application Serial No. PCT/US2013/044139, International Search Report mailed Sep. 16, 2013", 3 pgs.
"International Application Serial No. PCT/US2013/044139, Written Opinion mailed Sep. 16, 2013", 5 pgs.
"International Application Serial No. PCT/US2013/044445, International Search Report mailed Sep. 16, 2013", 3 pgs.
"International Application Serial No. PCT/US2013/044445, Written Opinion mailed Sep. 16, 2013", 9 pgs.

(56) References Cited

OTHER PUBLICATIONS

"International Application Serial No. PCT/US2013/044530, International Search Report mailed Sep. 4, 2013", 3 pgs.

"International Application Serial No. PCT/US2013/044530, Written Opinion mailed Sep. 4, 2013", 7 pgs.

"International Application Serial No. PCT/US2013/044543, International Search Report mailed Aug. 27, 2013", 4 pgs.

"International Application Serial No. PCT/US2013/044543, Written Opinion mailed Aug. 27, 2013", 8 pgs.

"International Application Serial No. PCT/US2013/053420, International Search Report mailed Dec. 2, 2013", 3 pgs.

"International Application Serial No. PCT/US2013/053420, Written Opinion mailed Dec. 2, 2013", 4 pgs.

"International Application Serial No. PCT/US2013/053428, International Search Report mailed Dec. 19, 2013", 4 pgs.

"International Application Serial No. PCT/US2013/053428, Written Opinion mailed Dec. 19, 2013", 8 pgs.

"International Application Serial No. PCT/US2013/053470, International Search Report mailed Nov. 21, 2013", 3 pgs.

"International Application Serial No. PCT/US2013/053470, Written Opinion mailed Nov. 21, 2013", 4 pgs.

"Non-Access Stratum (NAS) configuration Management Object (MO)", 3GPP TS 24.368 V11.2.0. Technical Specification Group Core Network and Terminals. Release 11., (Sep. 2012), 13 pgs.

Doppler, Klaus, et al., "Device-to-Device Communication as an Underlay to LTE-Advanced Networks", IEEE Communications Magazine, 47(12), (Dec. 2009), 42-49.

Ericson, Juniper, et al., "Device triggering procedure", 3GPP TSG-CT WG3 Meeting #69. C3-120956., [Online] retrieved from the internet: <http://v9ww.3gpp.org/ftp/tsg_ct/WG3_interworking_ex-CN3/TSGC3_69JKyoto/Docs/>, (May 21, 2012), 4 pgs.

Levy, Joseph, et al., "WLAN and Cellular Interworking and Discovery Use Case", IEEE 11-12/0346r0, (Mar. 9, 2012), 11 pgs.

Pekka, Janis, et al., "Interference-aware resource allocation for device-to-device radio underlaying cellular networks", IEEE, (2009), 5 pgs.

Zulhasnine, Mohammad, et al., "Efficient Resource Allocation for Device-to-Device Communication Underlaying LTE Network", IEEE 6th International Conference on Wireless and Mobile Computing, Networking and Communications, (2010), 368-375.

"U.S. Appl. No. 13/711,338, Advisory Action mailed Oct. 7, 2015", 3 pgs.

"U.S. Appl. No. 13/711,338, Response filed Sep. 24, 2015 to Final Office Action mailed Jul. 14, 2015", 10 pgs.

"U.S. Appl. No. 14/125,973, Non Final Office Action mailed Oct. 29, 2015", 18 pgs.

"U.S. Appl. No. 14/570,555, Non Final Office Action mailed Sep. 10, 2015", 18 pgs.

"Australian Application Serial No. 2013297042, Response filed Oct. 2, 2015 to Office Action mailed Jun. 3, 2015", 11 pgs.

"Belgian Application Serial No. 2013/0521, Response filed Nov. 9, 2015 to Search Report mailed May 15, 2015", W/ English Claims, 16 pgs.

"Finland Application Serial No. 20135806, Office Action mailed Sep. 22, 2015", 43 pgs.

"Finland Application Serial No. 20135807, Response filed Jul. 23, 2015 to Office Action mailed Mar. 26, 2015", In English Translation, 26 pgs.

"Japanese Application Serial No. 2015-523086, Office Action mailed Sep. 8, 2015", W/ English Translation, 9 pgs.

"Korean Application Serial No. 10-2015-7000080, Office Action mailed Sep. 24, 2015", W/ English Translation, 20 pgs.

"Korean Application Serial No. 2014-7036954, Response filed Sep. 24, 2015 to Reasons for Rejection mailed Jul. 24, 2015", W/ English Claims, 28 pgs.

"Spanish Application Serial No. 201331212, Response filed Feb. 24, 2015 to Office Action mailed Jul. 14, 2015", 10 pgs.

"Spanish Application Serial No. 201331212, Response filed Nov. 9, 2015 to Office Action mailed Jul. 14, 2015", W/ English Claims, 17 pgs.

QUALCOMM Incorporated, et al., "Operating System definition for DIDA", 3GPP TSG-CT WG1 Meeting #81, 3GPP, C1-125017, (Nov. 19, 2012).

"3rd Generation Partnership Project; Technical Specification Group Core Network and Terminals; Access Network Discovery and Selection Function (ANDBF) Management Object (MO) (Release 11)", 3GPP, 3GPP Draft; DRAPT_24312-B30,3rd Generation Partnership Project.(3GPP), Mobile Competence Centre ; 650, Route Des Lucioles ; M&921 Sophia Antiroub Cedex; France, (Jun. 15, 2015).

"U.S. Appl. No. 13/687,838, Notice of Allowance mailed Jul. 16, 2015", 17 pgs.

"U.S. Appl. No. 13/687,838, Response filed Jun. 10, 2015 to Final Office Action mailed Apr. 10, 2015", 15 pgs.

"U.S. Appl. No. 13/711,338, Final Office Action mailed Jul. 14, 2015", 14 pgs.

"U.S. Appl. No. 13/718,745, Examiner Interview Summary mailed Sep. 16, 2014", 3 pgs.

"U.S. Appl. No. 14/695,930, Preliminary Amendment filed Jul. 16, 2015", 8 pgs.

"Application-ID, C1-122866, Change Request 24,312 CR 0098 rev—Current version: 11.3.0 3GPP TSG-CT WG1 Meeting #79", Qualcomm: Incorporated, Chicago (USA), [Online] retrieved from the internet: <URL:http://www.3gpp.org/ftp/tsg_ct/WG1_mm-cc-sm_ex-CN1/TSGC1_79_Chicago//docs>, (Jul. 30, 2012), 1-15.

"Australian Application Serial No. 2013297042, Non Final Office Action mailed Jun. 30, 2015", 3 pgs.

"Belgian Application Serial No. 2013/0521, Search Report mailed May 15, 2015", W/ English Search Report, 11 pgs.

"Belgium Application Serial No. 2013/0522, Office Action mailed May 11, 2015", W/ English Search Report, 12 pgs.

"Korean Application Serial No. 2014-7036954, Reasons for Rejection mailed Jul. 24, 2015", W/ English Translation, 9 pgs.

"Spanish Application Serial No. 201331212, Office Action mailed Jul. 14, 2015", W/ English Translation, 8 pgs.

"Taiwanese Application Serial No. 102127609, Response filed Jun. 3, 2015 to Office Action mailed Dec. 1, 2014", W/ English Claims, 55 pgs.

Draft 2 Minutes of 3GPP, 3GPP TSG-SA WG1 Meeting #58: S1-122004, (2012), 78 pgs.

"Access Network Discovery and Selection Function (ANDSF) Management Object (MO)", ETSI TS 124 312 V11.4,0 (3GPP TS 24312 version 11.4.0 Release 11). Universal Mobile Telecommunications System (UMTS). LTE., (Oct. 2012), 170 pgs.

"Access to the 3GPP Evolved Packet Core (EPC) via non-3GPP access networks; Stage 3", ETSI TS 124 302 V11.4.0 (3GPP TS 24.302 version 11.4.0 Release 11). Universal Mobile Telecommunications System (UMTS). LTE., (Oct. 2012), 64 pgs.

"Canadian Application Serial No. 2,878,215, Office Action mailed Feb. 25, 2016", 5 pgs.

"Chinese Application Serial No. 201310336123.8, Office Action mailed Jan. 4, 2016", W/ English Translation, 9 pgs.

"Chinese Application Serial No. 201310435389.8, Office Action mailed Feb. 1, 2016", W/ English Translation, 6 pgs.

"European Application Serial No, 13825086.5, Extended European Search Report mailed Feb. 2, 2016", 7 pgs.

"European Application Serial No. 13825895.9, Extended European Search Report mailed Feb. 4, 2016", 10 pgs.

"European Application Serial No. 13826192.0, Partial Supplementary European Search Report mailed Feb. 8, 2016", 7 pgs.

"Finland Application Serial No. 20135806, Response filed Dec. 22, 2015 to Office Action mailed Sep. 22, 2015", W/ English Claims 5 pgs.

"Japanese Application Serial No. 2015-524265, Office Action mailed Dec. 22, 2015", W/ English Translation, 5 pgs.

"Korean Application Serial No. 10-2015-7000080, Response filed Feb. 24, 2016 to Office Action mailed Sep. 24, 2015", W/ English Translation, 34 pgs.

"Korean Application Serial No. 10-2015-7000081, Office Action mailed Dec. 28, 2015", W/ English Translation, 5 pgs.

"Korean Application Serial No. 10-2015-7000081, Response filed Dec. 12, 1016 to Office Action mailed Dec. 28, 2015", 9 pgs.

(56) References Cited

OTHER PUBLICATIONS

"Spanish Application Serial No. 201331212, Office Action mailed Dec. 28, 2015", W/ English Translation, 8 pgs.

"Use case: Enabling ProSe via LTE+WLAN+", 3GPP TSG-SA WG1 Meeting #58: S1-121089, (May 2012), 4 pgs.

"U.S. Appl. No. 14/125,973, Response filed Jan. 29, 2016 to Non Final Office Action mailed Oct. 29, 2015", 10 pgs.

"U.S. Appl. No. 14/570,555, Notice of Allowance mailed Feb. 19, 2016", 15 pgs.

"U.S. Appl. No. 14/570,555, Response filed Jan. 11, 2016 to Non Final Office Action mailed Sep. 10, 2015", 12 pgs.

"U.S. Appl. No. 14/883,410, Non Final Office Action mailed Feb. 26, 2016", 44 pgs.

"U.S. Appl. No. 14/883,410, Preliminary Amendment filed Dec. 21, 2015", 8 pgs.

\* cited by examiner

METHOD AND SYSTEM FOR ENABLING DEVICE-TO-DEVICE COMMUNICATION

CROSS-REFERENCE TO RELATED APPLICATIONS

This application claims priority to U.S. Provisional Patent Application Ser. No. 61/679,627, filed Aug. 3, 2012, which is incorporated herein by reference in its entirety.

TECHNICAL FIELD

Embodiments pertain to electronics. More particularly, some embodiments pertain to mobile electronic devices.

BACKGROUND ART

Proximity-based applications and services represent a fast growing social and technological trend that may have a major impact on the evolution of cellular wireless/mobile broadband technologies. These services are based on the awareness that two devices or two users are close to each other and, thus, may be able to directly communicate with each other in a device-to-device (D2D) configuration (also known as LTE Direct). Proximity-based applications include social networking, mobile commerce, advertisement, gaming, etc. D2D communication may also be important to public safety first responders, who could be able to use D2D to communicate without overloading a base station or evolved Node B (eNB). In addition, the use of D2D communication can result in offloading some traffic from a cellular network. It is desirable to have a more efficient method of establishing a D2D communication session between two or more D2D-capable devices.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DESCRIPTION OF THE EMBODIMENTS

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of devices" may include two or more devices.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the Alliance for Telecommunications Industry Solutions (ATIS), the China Communications Standards Association (CCSA), the European Telecommunications Standards Institute (ETSI), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for the Maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA. Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA and sometimes simply LTE) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies. 3GPP is also currently developing the LTE Advanced standard as an evolutionary advancement of LTE to provide even higher throughput.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. In addition, Single-Carrier Frequency Division Multiple Access (SC-FDMA) may be used in uplink transmissions. Each subcarrier is Modulated with a conventional modulation scheme, such as quadrature amplitude modulation (QAM), at a (relatively) low symbol rate when compared to the radio frequency (RF) transmission rate.

Mobile devices with the ability to communicate via cellular technologies, such as LTE and LTE Advanced, have become very prevalent in many countries. These devices may include smart phones, tablets, e-readers, mobile hotspots, and the like. Traditionally, such devices communicate to other devices via the core network. For example, data may travel from a mobile device through an evolved Node B (eNB) before being routed to its eventual destination. However, there is an increasing desire to have devices communicate directly to each other, without the use of an eNB.

In an exemplary situation, a, user with a mobile device, or user equipment (UE0) becomes physically close to another mobile device, UE1. A user may wish to transfer files, play a game, or otherwise communicate to UE1 from UE0. The connection between UE0 and UE1 may be automatically initiated by an application, or may be initiated by a user. It may be desirable, by both the underlying network and by the devices themselves, for UE0 to communicate directly to UE1. Such a connection has several benefits. For example, less traffic would pass through the eNB, allowing the eNB to service more devices. In addition, because UE0 would be communicating directly with UE1, which is in relative proximity, UE0 and UE1 may be able to use a lower-power mode to make such communications, resulting in power savings and longer battery life.

Figure 1:
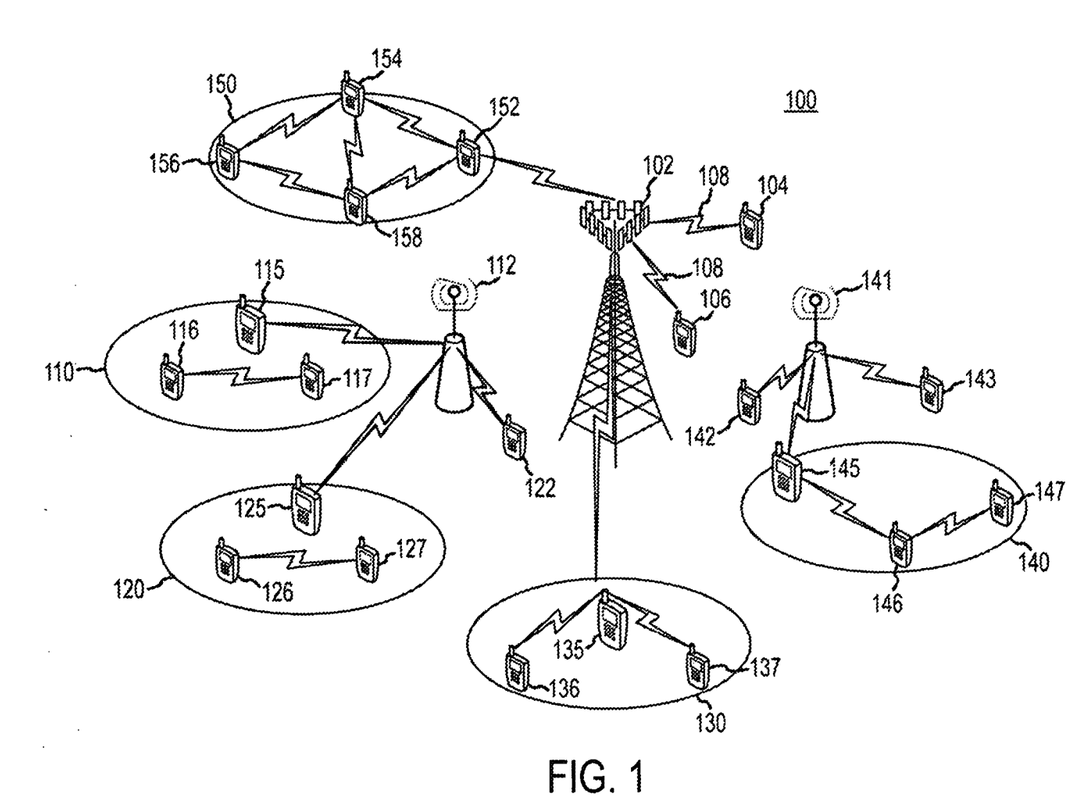
FIG. 1 is an exemplary network with multiple D2D connections.

FIG. 1 illustrates an exemplary system that combines a Device-to-Device ("D2D") network with a wireless access network, such as an LTE or LTE Advanced network. Mobile broadband network 100 includes a central coordinator, illustrated here as eNB 102. User equipment (UE) 104 and 106 communicate with eNB 102 via LTE communications channel 108.

Also illustrated in FIG. 1 are D2D clusters 110, 120, 130, 140, and 150. Each one of D2D clusters 110, 120, 130, 140, and 150 comprises a plurality of UEs that are capable of communicating directly with each other, without the need to communicate through eNB 102. This application may refer to a UE that has D2D capability as a dUE, to stand for D2D capable User Equipment. In FIG. 1, several different layouts of D2D clusters are shown. It should be understood that other configurations of D2D clusters are also possible. It should also be understood that a single eNB can support many more D2D clusters than are shown in FIG. 1.

Pico eNB 112 is coupled to eNB 102. Coupled to pico eNB 112 are D2D dusters 110 and 120. Within D2D cluster 110 is a D2D coordinator 115 and dUEs 116 and 117. D2D coordinator 115 serves to manage the communications between dUEs 116/117 and pico eNB 112. Within D2D cluster 120 is a D2D coordinator 125 and dUEs 126 and 127. Also coupled to pico eNB 112 is a UE 122. UE 122 is not coupled to D2D clusters 110 or 120. UE 122 may or may not have D2D capabilities.

dUEs 116 and 117 have a D2D connection with each other, where communications between dUE 116 and dUE 117 need not involve either pico eNB 112 or eNB 102. Instead, information is transmitted directly between dUE 116 and dUE 117. This set-up provides a variety of advantages. For example, because dUE 116 and dUE 117 are in close proximity to each other, they do not have to transmit data all the way to eNB 102—therefore, one or both devices may use a low-power transceiver mode, prolonging the battery life of dUE 116 and dUE 117. In addition, because eNB 112 and eNB 102 are not involved in transmissions between dUE 116 and dUE 117, the finite bandwidth capabilities of eNB 102 and pico eNB 112 are not used. If either dUE 116 or dUE 117 needs to communicate to eNB 102 or pico eNB 112, such a communication may occur through D2D coordinator 115. Although FIG. 1 illustrates several scenarios that involve the use of a D2D coordinator, it should be understood that communication between devices might be performed without any D2D coordinator, directly under the control of an eNB, such as eNB 102 or pico eNB 112. A similar configuration is present in D2D cluster 120, between dUE 126 and dUE 127, except there is no D2D coordinator in D2D cluster 120. It should be understood that there is a connection between D2D coordinator 115 and dUEs 116 and 117, it is merely omitted from FIG. 1.

D2D cluster 130 comprises D2D coordinator 135, dUE 136, and dUE 137. In D2D cluster 130, dUEs 136 and 137 may communicate directly with each other and with D2D controller 135. D2D coordinator 135 serves to control the D2D connection between dUE 136 and dUE 137. D2D 135 may also organize multicast/broadcast transmissions with dUE 136 or dUE 137. As above, dUEs 136 and 137 and D2D coordinator 135 free up the bandwidth of eNB 102 by using the same space as a single traditional. UE. Unlike D2D clusters 110 and 120, there is no pico eNB coupled to D2D cluster 130.

D2D cluster 140 comprises pico eNB 141, dUEs 142 and 143; D2D controller 145; and dUEs 146 and 147. dUEs 142 and 143 are coupled to pico eNB 1.41, but are not coupled to any other UEs. D2D coordinator 145 is also coupled to pica eNB 142. dUEs 146 and 147 are in a multi-hop configuration—only dUE 146 is coupled to D2D controller 145. If pico eNB wants to send data to dUE 146 it can send the data through D2D coordinator/controller dUE 145. If D2D controller needs to send a signal to dUE 147, the signal is transmitted first to dUE 146.

D2D cluster 150 comprises dUEs 152, 154, 156, and 158 coupled to each other in a mesh configuration, with each of the dUEs 152, 154, 156, and 158 coupled to each other as illustrated. If a dUE needs to send data to a dUE it is not directly coupled to (e.g., dUEs 152 and 156), it can send the data through a dUE that it is connected to (e.g., dUE 154). As with all connections illustrated in FIG. 1, a D2D controller is not necessary.

One of the benefits of D2D communication is the ability of move or offload some traffic that would normally be carried by the eNB to a D2D connection. One way to offload even more traffic to the D2D connection is to move some of the set up and maintenance of the D2D connection from the eNB to the UEs.

Below will be discussed a hypothetical connection between two UEs to be connected via a D2D connection. It should be understood, however, that a D2D connection is not limited to two UEs; the principles discussed below may be extended to support more than two D2D UEs in a D2D communication group.

In a hypothetical D2D connection between two UEs, one of the UEs may be used to establish the D2D connection. Using one of the UEs to establish a connection may result in several benefits. For example, it uses a certain amount of control overhead to monitor the status of various UEs. Using a UE to establish a connection uses the overhead of the UE, instead of the overhead of the eNB, freeing the eNB to perform other tasks.

Typically, when a UE connects to a network, it may send information about its D2D abilities to the eNB. This information may include its D2D profile and any D2D restrictions. In the alternative, the D2D profile and D2D restriction information may be configured through other means, such as a user's subscription profile that may be contained in a Home Location Register (HLR) or some other network entity. Additionally, a network may be configured with network-specific D2D policies/restrictions. These policies/restrictions may include limitations such as geographical restrictions, roaming restrictions, bandwidth policies, and the like.

Figure 2:
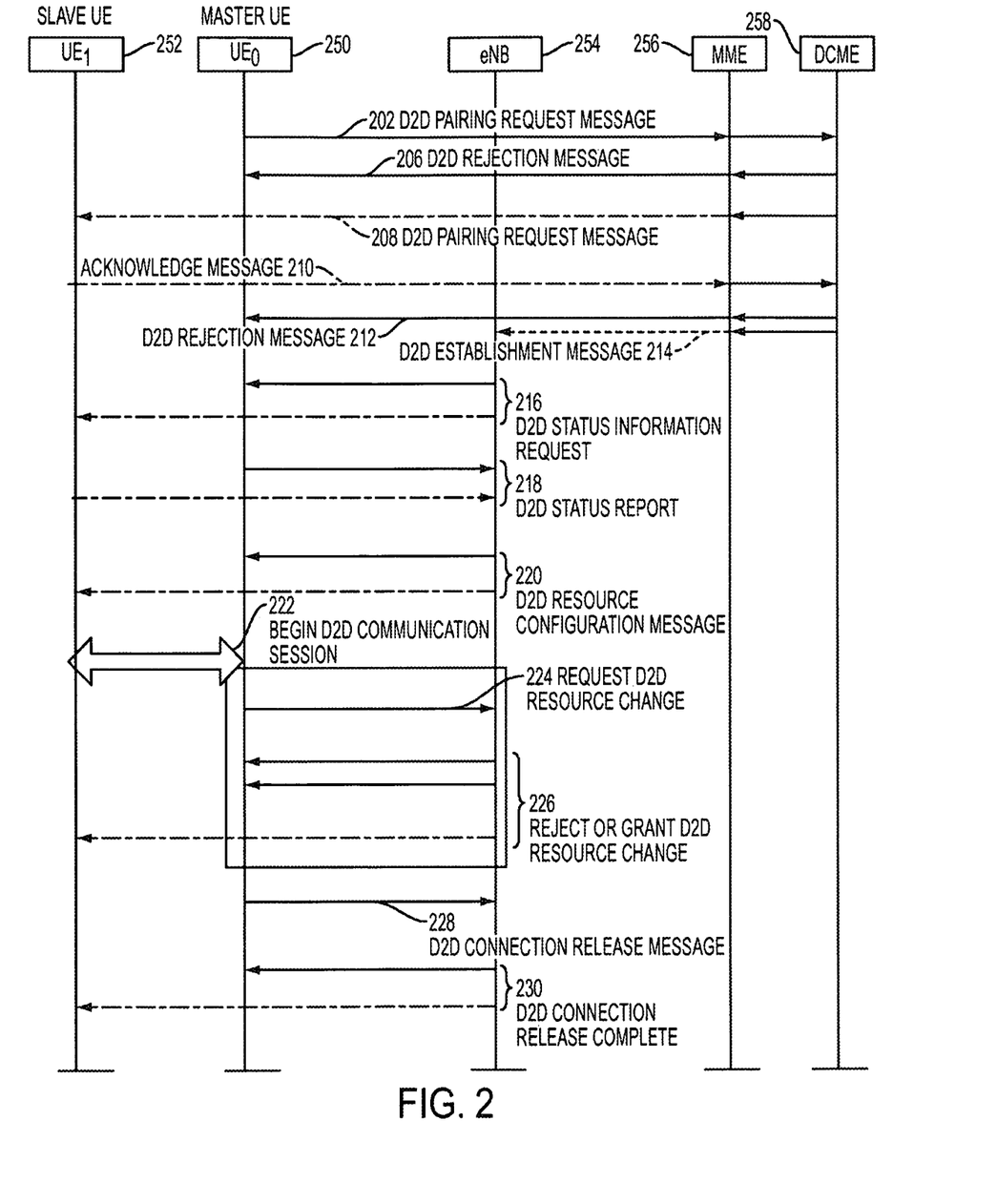
FIG. 2 is a diagram illustrating the operation of an embodiment.

With reference to FIG. 2, an exemplary method to establish a D2D connection is presented. In the description below, a connection is to be established between two UEs we will call UE0 (250) and UE1 (252). Other actors in this method may include an eNB 254 and a Mobility Management Entity (MME) 256 and a D2D management entity (DCME) 258.

UE0 250 initiates the setup procedure by sending a message to MME 256 (202). This message may be a D2D setup/pairing request NAS (Non-Access Stratum) message. The message may contain an identifier of the target UE (in this case, UE1). The identifier may be any identifier that uniquely identifies UE1, such as a D2D ID or UE ID. The D2D ID may be a newly defined identifier that is allocated for each D2D UE after the UE reports its ability for D2D communication during an attach procedure. The identifier may also be another unique identifier, such as a Mobile Subscriber Integrated Services Digital Network Number (MSISDN), a globally unique temporary identifier (GUTI), a temporary mobile subscriber identifier (TMSI), an international mobile subscriber identifier (IMSI), or the like. UE0 may have become aware of the D2D ID or UE ID during the discovery stage. Alternatively, UE0 may become aware of the target UE's D2D ID or UE ID via a D2D UE list provided by the eNB. The eNB may have compiled the D2D UE list via messages sent by each UE as they connect to the eNB. This message may be forwarded from MME 256 to DCME 258.

Thereafter, the MME or the DCME checks with the policy charging and rules function (PCRF) for policy authorization before enabling the D2D mode (not shown in FIG. 2). If a D2D connection between UE0 and UE1 is not allowed, the request is rejected and the connection is not made (206). There may be a D2DConnection Reject message sent by a D2D Communication Management Entity (DCME) to UE0. This message may be based on the profile/restriction information.

In the alternative, it is also possible that information about the UE's D2D capabilities, such as policies/restrictions, may not be available at the core network side. In such a case, the targeted UE (UE1 in this case) can decide whether to accept the D2D setup request from UE0.

If a D2D connection between UE0 and UE1 is allowed or otherwise not prohibited, the MME forwards the D2D setup/pairing request message to UE1 (208). The setup/pairing request message may contain the D2D ID, the UE ID, or other identifier of UE0. In response to the setup/pairing request message, UE1 sends an Acknowledge message to the MME that either accepts or rejects the D2D communication setup request (210). In other words, at this point, UE1 also has the option to reject the D2D connection. A user may configure UE1 so as to only accept requests from certain UEs, to reject all D2D connection requests, or the like. A user may wish to do so for bandwidth conservation reasons, power saving reasons, privacy reasons, or a variety of other reasons. If UE1 rejects the setup request, the Acknowledge message may be a D2DConnectionReject message. The D2DConnectionReject message is forwarded to UE0, and the setup process terminates (212).

In a situation where a D2D connection is allowed and UE1 accepts the connection, the MME sends one or more messages to the eNB to inform the eNB of the establishment of a D2D connection between UE0 and UE1 (214). The messages may include a D2DSetupRequest message sent via Si application protocol (AP). The messages may also include the D2D ID, UE ID, or other identifier of both UE0 and UE1, the buffer status report (BSR) of UE0 and UE1, the Quality of Service (QoS) requirements of the D2D connection, and the like.

After receiving the D2DSetupRequest message from the MME, the eNB sends a D2DUEStatusInformationRequest message via RRC to both UE0 and UE1 (216). This message triggers UE0 and UE1 to report the various information used for subsequent D2D resource allocation by the eNB.

After receiving the above-described message, UE0 and UE1 both respond with a D2DUEStatusInformationReport message (218). These messages may contain. D2D related information, such as a buffer status report (BSR), antenna configuration, device-to-device link quality measurement report, QoS requirements, and the like.

The eNB then sends a D2DResourceConfiguration message to both UE0 and UE1 (220). This message allocates resources for the D2D communication and may be sent via either radio resource control (RRC) signaling or by dynamic physical downlink control channel (PDCCH) signaling. The resources may be allocated based on information contained in the BSR from UE0 and UE1, D2D link quality measurement, the requested QoS level, and the like.

The D2DResourceConfiguration message may also contain: Resource Block (RB) assignment, which indicates the RB index to be used in D2D communication; D2DResourceIntervalUL, which indicates the time interval between two successive D2D subframes; and D2DResourceConfigDuration, which indicates the duration of D2D resources to be allocated to UE0 and UE1. The D2DResourceConfiguration message may also assign one of UE0 or UE1 as the master UE (M-UE). Thereafter, D2D communication between UE0 and UE1 begins (222).

The RB assignment indicates the RB index, in frequency domain for D2D communication, which is commonly used for D2D communication by the UEs in the D2D pair. The resources may be orthogonal to minimize potential inter-UE interference to other UEs communicating with the eNB via the cellular link.

The D2DResourceIntervalUL refers to the time interval between two successive D2D subframes. This may be denoted in terms of the number of subframes. In LTE, frames are typically 10 milliseconds (ms) in length and are each divided into ten subframes of 1 ms in length. Thus, a resource allocation for a D2DResourceIntervalUL of 6 may correspond to 6 subframes, or 6 ms.

The D2DResourceConfigDuration message indicates the duration (in milliseconds) of D2D resources allocated for a D2D pair.

During the communication, resources may be dynamically re-allocated within the D2D pair by one of the UEs, called the Master-UE (M-UE), e.g., in response to changing traffic load of the D2D pair. For example, the D2D resources configuration for the transmission/reception of the slave UE (S-UE) could be changed by the M-UE. This process is detailed below, with reference to FIGS. 3A through 3D. In addition, the M-UE could decide to dynamically change the modulation and coding scheme (MCS) for UEs in the D2D pair based on the D2D link quality between UE0 and UE1. The MCS may be used to determine the modulation and coding rate of data transmission, based on the quality of the connection between UE0 and UE1.

The M-UE may be designated by the eNB in the D2D Resource Configuration message, as described above. In the alternative, the initiating UE (UE0 in this example) may become the M-UE by default.

Figure 3A:
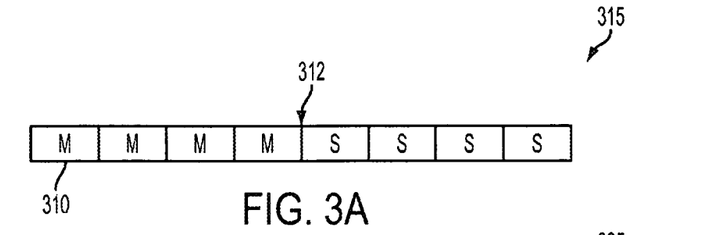
FIGS. 3A through 3D are exemplary transmission windows in an embodiment.

One variable that may be changed by the M-UE is the size and configuration of the transmission window. This will be explained with reference to FIGS. 3A through 3D. In the context of D2D communication, the D2D downlink (D-DL) refers to the link from the M-UE to the S-UE. The D2D uplink (D-UL) refers to the link from the S-UE to the M-UE. A D2D transmission window 315 comprises a number of consecutive subframes 310, including D-DL subframes sent by M-UE and D-UL subframes sent by S-UE. In FIG. 3A, there are four D-DL subframes followed by four D-UL subframes. The subframes labeled M are D-DL subframes (those sent by the M-UE). The subframes labeled S are D-UL subframes (those sent by the S-UE).

These numbers may be dynamically changed by the M-UE. For example, there may be a signaling field called Timeslot Assignment (TA) that could be used to indicate the switching point 312 (the change from D-DL to D-UL) within each transmission window. For example, in FIG. 3B, transmission window 325 has three D-DL frames, then switching point 320 occurs, changing TA from 0 to 1, indicating that the UEs switch from D-DL to D-UL. Similarly, in FIG. 3C, transmission window 335 has five D-DL frames, then switching point 330 occurs, changing TA from 0 to 1, indicating that the UEs switch from D-DL to D-UL.

Figure 3B:
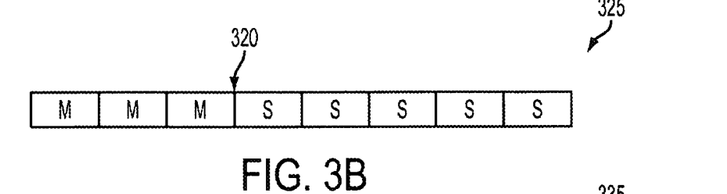
Figure 3C:
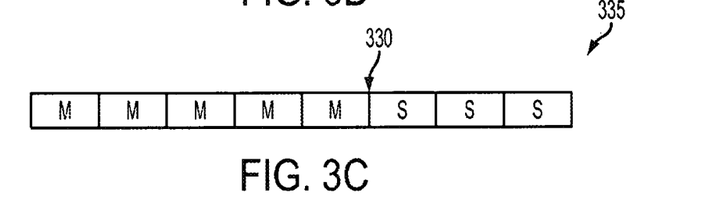
Figure 3D:
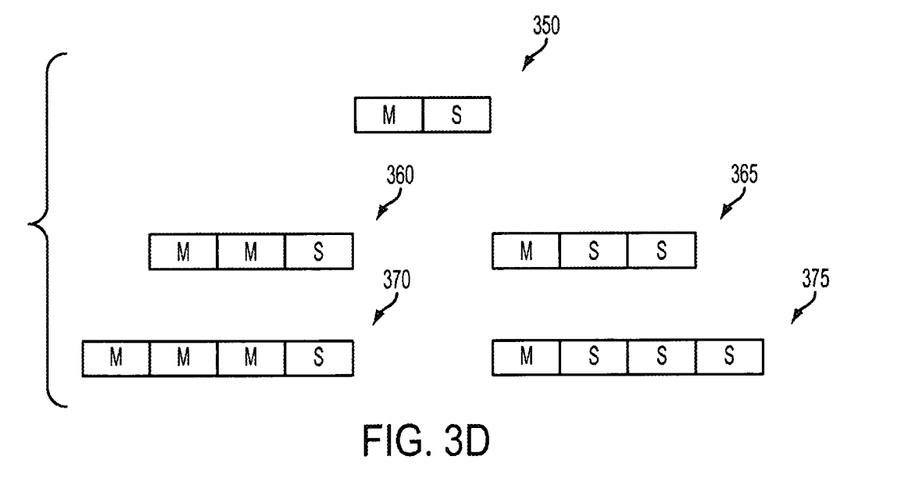

In an alternative embodiment, shown in FIG. 3D, there may be a variable transmission window size. The embodiment of FIGS. 3A through 3C show eight subframes per transmission window (though it should be understood that, in the fixed transmission window size embodiment of FIGS. 3A through 3C, the number of subframes may be either greater than or less than eight.) In contrast, the embodiment of FIG. 3D shows a variable transmission window size. As illustrated in FIG. 3D, the transmission window may comprise two, three, or four subframes (although not illustrated in FIG. 3D, it should be understood that more than four subframes may also be used), with the transition from D-DL to D-UL being triggered by TA switching from 0 to 1. In such an embodiment, the TA may also be arranged to indicate the size of the transmission window. For example, after indicating that the transition from D-DL to D-UL should occur, TA may also indicate the number of D-UL frames to be sent.

In FIG. 3D, transmission window 350 contains two subframes, a D-DL subframe and a D-UL subframe. Transmission windows 360 and 365 show two alternate transmission window configurations containing three subframes. In transmission window 360, there are two D-DL subframes followed by one D-UL subframe. In transmission window 365, there is one D-DL subframe followed by two D-UL subframes. Transmission windows 370 and 375 show two alternate transmission window configurations containing four subframes. Transmission window 370 has three D-DL subframes followed by one D-UL subframe. Transmission window 375 has one D-DL subframe followed by three D-UL subframes. It should be understood that other combinations of one or more consecutive D-DL subframes followed by one or more consecutive D-UL subframes may also be used, even if they are not illustrated in FIG. 3D With continued reference to FIG. 2, the discussion of the D2D connection between UE0 and UE1 continues. After the D2D connection is established (see above), the M-UE may directly request resources from the cNB (224). This request may be made based on the BSR of the D2D pair. In order to know the BSR of S-LTE, the S-UE may periodically report its BSR to M-UE. There may be several other reasons for making the request to dynamically change the resources allocated to the D2D connection. For example, as discussed above, the traffic between UE0 and UE1 may not be symmetrical. That is, UE0 may be sending more data to UE1 than UE1 does to UE0. In such a situation, UE0 may want the transmission windows between UE0 and UE1 to be resized to reflect such an asymmetrical data pattern.

After receiving a request for additional resources, the eNB may either reject this request or accept the request by sending new D2D resource allocation to UE0 and UE1 (226). In such a manner, the eNB does not have to monitor the D2D connection between UE0 and UE1, yet is still able to change the resource allocation as needed. In addition, the eNB may reallocate resources to a D2D pair on its own, without a request for additional resources, based on the D2D link quality feedback periodically received from the M-UE.

When it is desired to terminate the D2D connection, the M-UE sends a D2DConnectionRelease message to the eNB (228). The eNB receives the D2D connection release message, releases the D2D connection, and sends a D2DConnectionReleaseComplete message to both UE0 and UE1 (230). Thereafter, the resources formerly used for the D2D connection are free for use by other devices.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Figure 4:
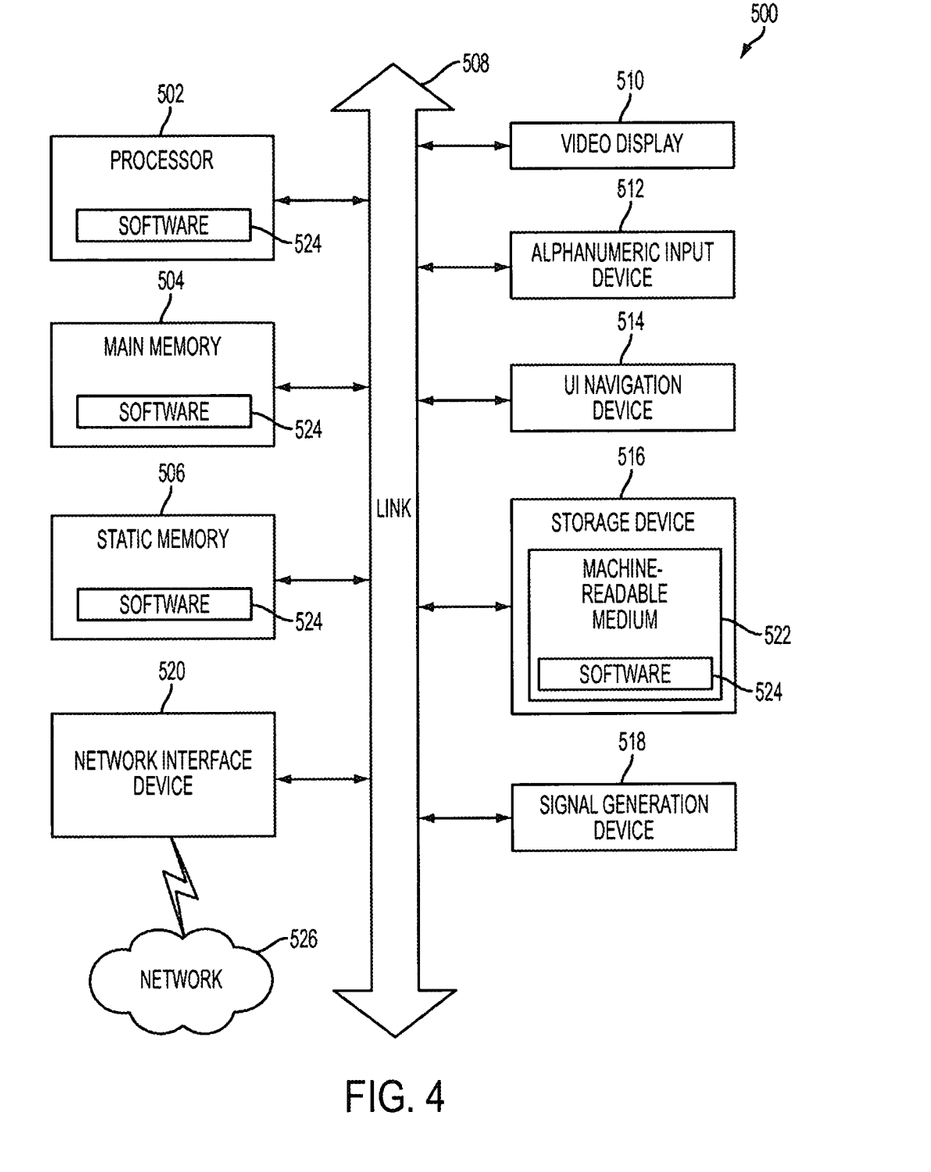
FIG. 4 is a block diagram illustrating an exemplary machine capable of performing an embodiment.

FIG. 4 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a smartphone, a web appliance, a network router, switch or bridge, a dedicated navigation device, laptop computers, a television, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse or track pad). In an, example, the display device 510, input device 512 and UI navigation device 514 may be a touch screen display that accomplishes all three tasks. The machine 500 may additionally include a mass storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine-readable media.

While the machine-readable medium 522 is illustrated as a single medium, the term "machine-readable medium" may include a single medium or multiple media (e.g., a centralized or distributed database, and/or associated caches and servers) that is arranged to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EE-PROM)) and flash memory devices; magnetic disks, such as internal hard disks and removable disks; magneto-optical disks; and CD-ROM, DVD-ROM, and Blu-Ray disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The following examples pertain to further embodiments.

Example 1 includes a method performed by a D2D communication management entity (DCME) for establishing a device-to-device (D2D) communication session between a first user equipment (UE) and a second UE, the method comprising: receiving a request from the first UE to establish the D2D communication session; sending a pairing request message to the second UE; and after receiving an acknowledgement from the second UE, sending a D2DSetupRequest message to an evolved Node B (eNB).

In example 2 the subject matter of example 1 may optionally further comprise: checking a policy charging and rules function to determine if a D2D communication between the first UE and the second UE is forbidden; and if a D2D communication between the first UE and the second. UE is forbidden, sending a D2DConnectionReject message arranged to inform the first UE that the request is denied.

In example 3, the subject matter of example 1 may optionally further comprise: sending a D2DConnectionReject message to the first UE if the second UE refuses the connection request.

Example 4 is a method performed by an evolved Node B (eNB) for establishing a device-to-device (D2D) communication session between a first user equipment (UE) and a second UE, the method comprising: receiving a D2DSetupRequest message from a D2D communication management entity (DCME) arranged to indicate that the eNB is to establish the D2D communication session; sending a D2DUEStatusInformationRequest message to the first UE and the second UE; receiving a D2DUeStatusInformationReport message from the first UE and from the second UE; allocating resources to the D2D communication session; and sending a D2DResourceConfiguration message to the first UE and to the second UE, detailing the allocated resources.

In example 5, the subject matter of example 4 may optionally include the additional feature wherein the D2DUEStatusInformationRequest message is arranged to request information from the first UE and from the second UE, the information chosen from the group comprising: a buffer status report, antenna configuration, link quality measurement reports, Quality of Service requirements.

In example 6, the subject matter of example 5 may optionally include the additional feature wherein the D2DUeStatusInformationReport message is arranged to send information to the eNB, the information chosen from the group comprising: a buffer status report, antenna configuration, link quality measurement reports, Quality of Service requirements.

In example 7, the subject matter of example 4 may optionally include the additional feature wherein the D2DResourceConfiguration message is sent via either radio resource control (RRC) signaling or via dynamic physical downlink control channel (PDCCH) signaling.

In example 8, the subject matter of example 4 may optionally include the additional feature wherein the D2DResourceConfiguration message further comprises one or more of the following: a resource block assignment arranged to indicate a resource block index to be used for the D2D communication session; a D2DResourceIntervalUL message arranged to indicate a time interval between successive D2D subframes; and a D2DResourceConfigDuration message arranged to indicate a duration of D2D resources to be allocated to the D2D communication session.

In example 9, the subject matter of example 8 may optionally include the additional feature wherein the D2DResourceConfiguration message is further arranged to designate one of the first UE or the second UE as a Master UE.

In example 10, the subject matter of example 9 may optionally further comprise: receiving a D2DResourceRequest message from the Master UE, wherein the D2DResourceRequest message is arranged to request a re-allocation of resources to the D2D connection; and re-allocating resources to the D2D connection based on the D2DResourceRequest message.

In example 11, the subject matter of example 4 may optionally further comprise receiving a D2DConnectionRelease message from the first UE; re-allocating resources that were used by the D2D connection; and sending a D2DConnectionRelease message to the first UE and to the second UE.

Example 12 is a method performed by a first user equipment (UE) for modifying a device-to-device (D2D) communication session with a second UE, the method comprising: determining that a resource allocation between the first user equipment and the second user equipment should be changed; sending one or more D2D uplink frames; sending a timeslot assignment (TA) message arranged to indicate to the second UE to start sending D2D frames; and receiving one or more D2D downlink frames from the second UE; and sending a TA message from the first UE to the second UE to dynamically re-allocate the number of D2D frames between the first UE and the second UE.

In example 13, the subject matter of example 12 may optionally include the additional feature wherein the timeslot assignment message is further arranged to indicate a size of a transmission window, wherein the size of the transmission window is equal to the sum of the number of D2D uplink frames from the first UE to the second UE and the number of D2D frames from the second UE to the first UE.

In example 14, the subject matter of example 13 may optionally include the additional feature wherein: the size of the transmission window is variable; and further wherein the timeslot assignment message is further arranged to indicate the size of the transmission window.

In example 15, the subject matter of example 13 may optionally include the additional feature wherein the size of the transmission window is fixed.

In example 16, the subject matter of example 12 may optionally further comprise changing a modulation and coding scheme (MCS) for the D2D communication session.

Example 17 is a user equipment (UE) arranged to communicate via a device to device (D2D) communication session between the UE and a second UE, the user equipment comprising: a processor; a transceiver coupled to the processor and arranged to transmit and receive signals via an antenna assembly; wherein the processor is arranged to: determine that a resource allocation between the UE and the second UE should be changed; send one or more D2D uplink frames to the second UE; send a timeslot assignment (TA) message arranged to indicate to the second UE to start sending D2D frames; receive one or more D2D downlink frames from the second UE; and send a TA message from the UE to the second UE to dynamically re-allocate the number of D2D frames between the UE and the second UE.

In example 18, the subject matter of example 17 may optionally include the additional feature wherein the timeslot assignment message is further arranged to indicate a size of a transmission window, wherein the size of the transmission window is equal to the sum of the number of D2D uplink frames from the first UE to the second UE and the number of D2D frames from the second UE to the first UE.

In example 19, the subject matter of example 17 may optionally include the additional feature wherein: the size of the transmission window is variable; and further wherein the timeslot assignment message is further arranged to indicate the size of the transmission window.

In example 20, the subject matter of example 17 may optionally include the additional feature wherein the size of the transmission window is fixed.

In example 21, the subject matter of example 17 may optionally include the additional feature wherein the processor is further arranged to: change a modulation and coding scheme (MCS) for the D2D communication session.

Example 22 is a machine-readable medium including instructions for modifying a device-to-device (D2D) communication session between a first user equipment (UE) and a second UE, which when executed by a first computing device, cause the first computing device to: determine that a resource allocation between the first user equipment and the second user equipment should be changed; send one or more D2D uplink frames; send a timeslot assignment (TA) message arranged to indicate to the second UE to start sending D2D frames; receive one or more D2D downlink frames from the second UE; and send a timeslot assignment (TA) message from the first UE to the second UE to dynamically re-allocate the number of D2D frames between the first UE and the second UE.

In example 23, the subject matter of example 22 may optionally include the additional feature wherein the timeslot assignment message is further arranged to indicate a size of a transmission window, wherein the size of the transmission window is equal to the sum of the number of D2D uplink frames from the first UE to the second UE and the number of D2D frames from the second UE to the first UE.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

We claim:

1. A method performed by a first user equipment (UE) for modifying a device-to-device (D2D) communication session with a second UE, the method comprising:
   locally producing a change determination that a resource allocation between the first user equipment and the second user equipment should be changed;
   sending one or more D2D uplink frames to the second UE;
   sending a first timeslot assignment (TA) message arranged to indicate to the second UE a transmission window for consecutive D2D frames, wherein the transmission window includes consecutive uplink frames and downlink frames to be communicated between the first UE and the second UE;
   receiving one or more D2D downlink frames from the second UE; and
   sending a second TA message to the second UE to dynamically re-allocate the number of D2D frames between the first UE and the second UE;
   wherein the change determination is produced based on an assessment of uplink D2D and downlink D2D asymmetry in an ongoing D2D session, and wherein the second TA message includes an indication of change in ratio of uplink and downlink frames to correspond to the uplink D2D and downlink D2D asymmetry.

2. The method of claim 1 further comprising:
   in response to the change determination, changing a modulation and coding scheme (MCS) for the D2D communication session.

3. The method of claim 1, further comprising:
   in response to the change determination, sending a request to effect a change in resource allocation to an evolved-node B (eNB) device.

4. The method of claim 1, wherein the first TA message is arranged to indicate a size of the transmission window, and wherein the second TA message indicates a change in the size of the transmission window in response to the change determination.

5. A first user equipment (UE) arranged to communicate via a device to device (D2D) communication session between the first UE and a second UE, the first user equipment comprising:
   a processor;
   a transceiver coupled to the processor and arranged to transmit and receive signals via an antenna assembly;
   wherein
   the processor is arranged to:
     produce a change determination that a resource allocation between the first UE and the second UE should be changed;
     direct the transceiver to send one or more D2D uplink frames to the second UE;
     direct the transceiver to send a first timeslot assignment (TA) message arranged to indicate to the second UE a transmission window for consecutive D2D frames, wherein the transmission window includes consecutive uplink frames and downlink frames to be communicated between the first UE and the second UE;
     direct the transceiver to receive one or more D2D downlink frames from the second UE; and
     direct the transceiver to send a second TA message to the second UE to dynamically re-allocate the number of D2D frames between the first UE and the second UE;
   wherein the change determination is produced based on an assessment of uplink D2D and downlink D2D asymmetry in an ongoing D2D session, and wherein the second TA message includes an indication of change in ratio of uplink and downlink frames to correspond to the uplink D2D and downlink D2D asymmetry.

6. The UE of claim 5 wherein the processor is further arranged to:
   change a modulation and coding scheme (MCS) for the D2D communication session.

7. The UE of claim 5, wherein the processor is further arranged to:
   in response to the change determination, direct the transceiver to send a request to effect a change in resource allocation to an evolved-node B (eNB) device.

8. The UE of claim 5, wherein the first TA message is arranged to indicate a size of the transmission window, and wherein the second TA message indicates a change in the size of the transmission window in response to the change determination.

* * * * *